United States Patent [19]

Fricke

[11] 4,236,902

[45] Dec. 2, 1980

[54] MODULAR AIR PURIFYING DEVICE

[76] Inventor: Roy A. Fricke, 1034 Ashland Ave., River Forest, Ill. 60305

[21] Appl. No.: 961,019

[22] Filed: Nov. 15, 1978

[51] Int. Cl.³ .............................................. B01D 50/00
[52] U.S. Cl. ........................................ 55/279; 55/316; 55/323; 55/518; 422/122
[58] Field of Search ................ 55/279, 316, 323, 328, 55/329, 357, 387, 411, 412, 469, 472, 482, 491, 501, 503, 505, 512, 517, 518, 519, DIG. 35; 422/120, 122

[56] References Cited

U.S. PATENT DOCUMENTS

| | | | |
|---|---|---|---|
| 1,786,756 | 12/1930 | Juelson | 55/472 |
| 2,043,298 | 6/1936 | Markels | 55/512 |
| 2,087,688 | 7/1937 | Johnson | 55/503 |
| 2,096,851 | 10/1937 | Fricke | 55/316 |
| 2,562,839 | 7/1951 | Winston | 55/316 |
| 2,669,287 | 1/1955 | Daninhirsch | 55/357 |
| 2,751,999 | 6/1956 | Semon | 55/519 |
| 2,825,424 | 3/1958 | Gross | 55/316 |
| 2,928,496 | 3/1960 | Schneider | 55/518 |
| 3,966,442 | 6/1976 | Waters | 55/316 |
| 4,121,916 | 10/1978 | Fricke | 55/316 |

FOREIGN PATENT DOCUMENTS

| | | | |
|---|---|---|---|
| 979768 | 12/1975 | Canada | 55/316 |
| 1136897 | 9/1962 | Fed. Rep. of Germany | 55/316 |

*Primary Examiner*—David L. Lacey
*Attorney, Agent, or Firm*—Alter and Weiss

[57] ABSTRACT

A portable air filter and absorber device for removing impurities such as gases and finely divided solids from the atmosphere includes a sectionalized cylindrical housing containing a blower mechanism operatively connected to a motor driving section. An activated carbon section is detachably mounted adjacent the blower section for removing odors and noxious gases from the atmosphere and attached in series to the activated carbon section is a fibrous section which acts to filter particulate material from the air prior to its entry passage into the carbon granule section. The sectionalized cylindrical housing includes a plurality of inner annular grooves which are adapted to matingly engage projecting end portions of the carbon granular section and the fibrous filter section to permit predetermined mounting of these sections in series to the housing.

9 Claims, 8 Drawing Figures

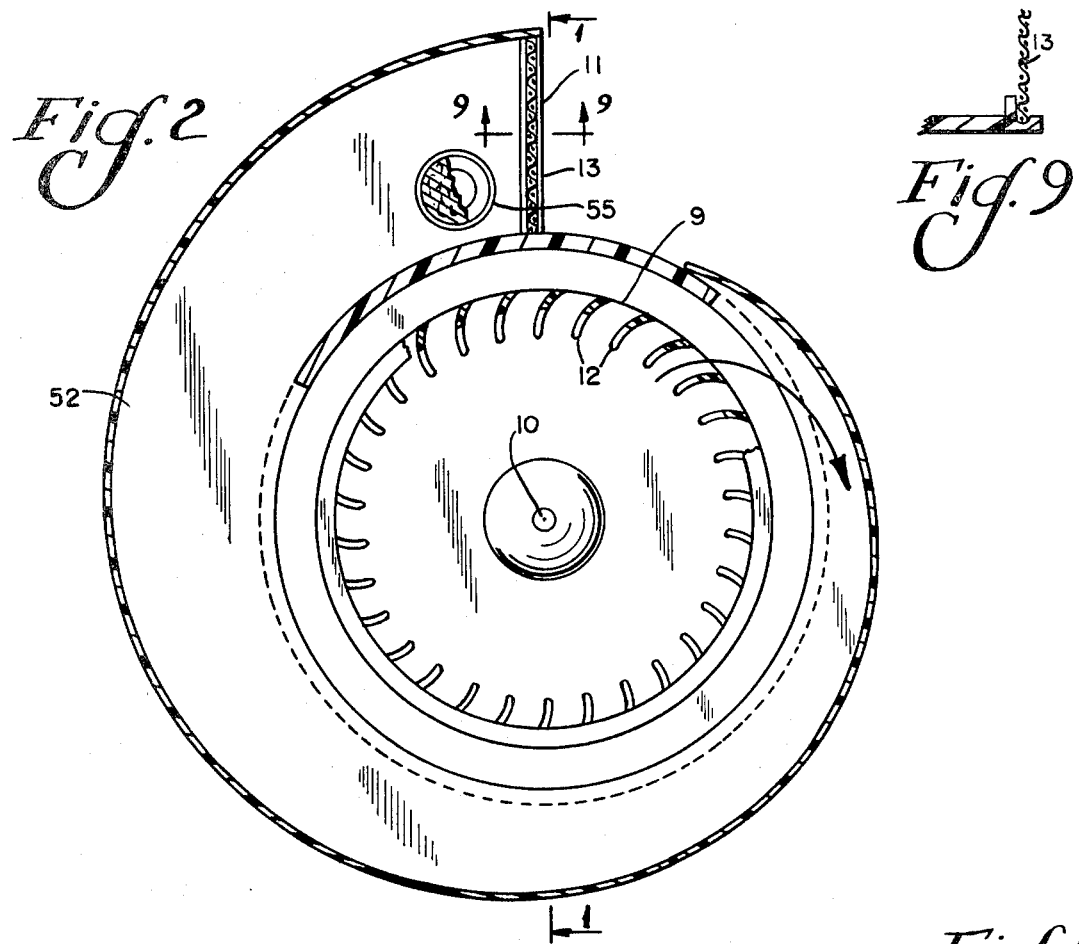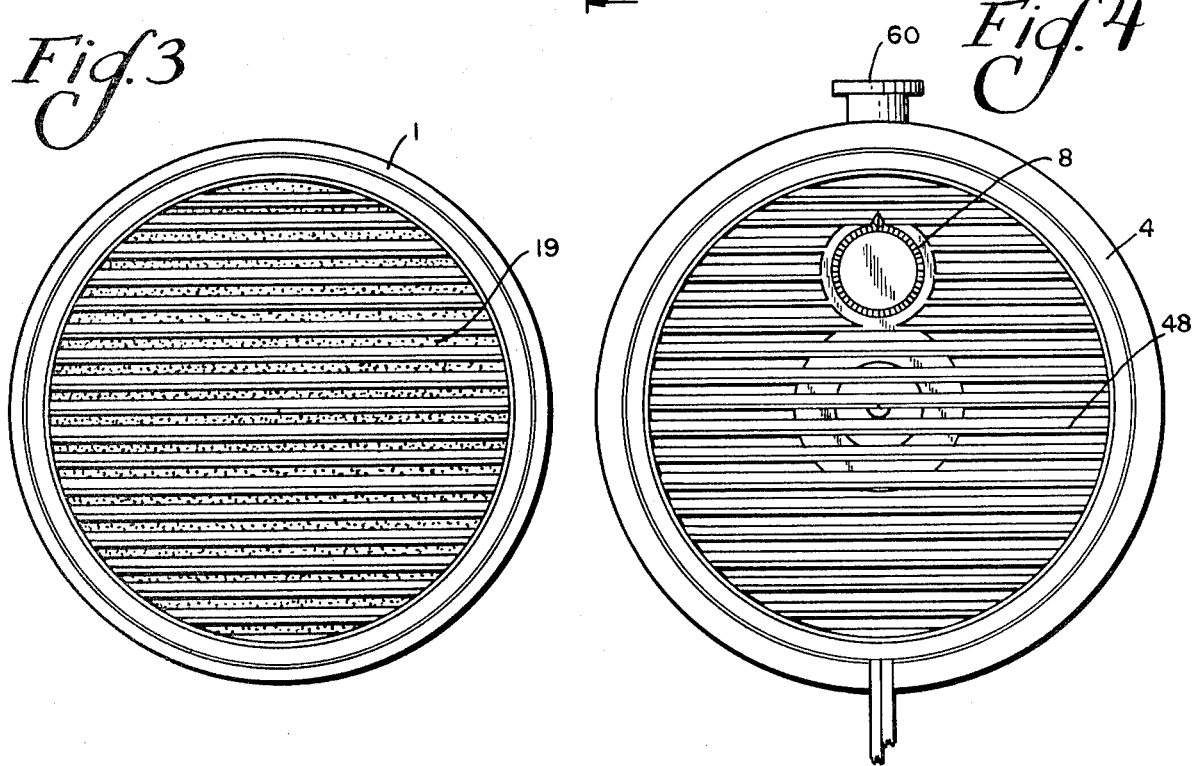

4,236,902

MODULAR AIR PURIFYING DEVICE

BACKGROUND OF THE INVENTION

In the past, devices for filtering particulate and removing gases have included complicated screens and filtering mediums which are inserted into such devices. One such device is described and claimed in U.S. Pat. No. 4,121,916 invented by the present Applicant. Although such devices are somewhat compact and portable, such devices have not permitted the flexibility or interchangeability of utilizing an activated absorber section together with a fibrous filter section or the use of a fibrous filter section to remove air borne particulars such as dust, pollen, tobacco smoke, molds and the like.

Additionally, existing air filter and purifying devices do not afford ready access to the fibrous filter and/or activated absorber material or other types of neutralizing material to permit the removal and recharging of the device as desired by the user. Moreover, the construction of such devices has not avoided the problem of noise or the rattling of the loose absorber material or parts upon the change of position of the air filter and purifying device. Accordingly, the wide spread application of such devices has been severely restricted.

SUMMARY OF THE INVENTION

Accordingly, it is one object of the present invention to provide an air filter and absorber device having a cylindrical housing composed of sections which include a blower section operatively connected to a motor section and an activated absorber section mounted adjacent thereto and a fibrous filter section mounted in series adjacent the activated absorber section.

It is another object of the present invention to provide an air filter and absorbing device wherein the activated absorber section may be removably mounted therefrom and the fibrous filter section may be mounted adjacent the blower and motor assembly sections.

It is a further object of the present invention to provide an air filter and absorber device having an absorber material which is granular in form and is contained and combined within the absorber section to provide a path of predetermined density and stability for the flow of air through the neutralizing section thereby avoiding the noise of flowing granular material during changing of position of the device and to predetermine the flow of air therethrough.

It is still another object of the present invention to provide a portable electric operated air purifying and absorbing device for accompanying personal movement within a limited range of electric supply.

An, it is still a further object of the present invention to provide a purifying and absorbing device capable of being quickly and easily recharged with a fresh supply of material of an activated absorbing material while confining the same under sufficient pressure during use to avoid looseness of the material and noise arising from undesirable movement of the material during usage of the device.

Briefly, the air purifying and absorbing device of the present invention includes a generally cylindrical casing or housing comprised of sections which include an inlet end and first plastic screen and then a fibrous filter body confined in a cylindrical casing section in series adjacent to an activated absorber or neutralizing body section confined under compression and so designed and arranged as to eliminate channeling of the air flow through the absorber or the neutralizing section. Positioned beyond the activated absorber or neutralizing section of the cylindrical casing or housing is a centrifigal blower section having a volute exit and an impeller mounted therein. The outlet of the volute may be directed in any direction in a plane normal to the longitudinal axis of the casing. The hub of the impeller is attached to and carried by the shaft to a driving motor, which motor is contained in an extension of the general cylindrical casing on the side of the blower section opposite the side of the filtering sections. A carrying strap is provided which balances lengthwise the weight of the device, making it convenient for handling and general portability. The device is adapted to be operated by an electric motor which may be operated indoors by house current or outdoors in an automobile by battery current. A suitable adaptor for this may be provided.

Thus, the present invention provides the means in the form of motor driven blower to move a current of air containing particles and gaseous constituents therein through one or more filter beds which remove the undesirable particles and provide neutralizers or absorbers for rendering harmless certain injurious and irritating components contained in the atmosphere, as well as odors such as tobacco and the like. Although such odors may not be present in the atmosphere in sufficient proportions to damage a user, nevertheless, the present invention removes to a high degree any irritants or disagreeable gases, vapors or air-borne solids whereby the air treated by the present invention is purified and deodorized.

Additionally, the present invention possesses a construction which facilitates replacement of "stale" activated absorbing material with a fresh supply of such material, while being capable of confining the absorbing material under sufficient pressure, in use, to avoid any looseness and noise which may arise from the movement of the air through the purifying and absorbing device. Importantly, barriers are provided in the activated carbon or neutralizing section to prevent free flow of treated gases allowing additional interface between the granular absorbing material and the air. Such increased contact between the treated air and the absorbing or neutralizing material provides enhanced removal of the injurious and irritating components contained in the atmosphere.

BRIEF DESCRIPTION OF THE DRAWINGS

FIG. 2 is a cross-sectional view taken along lines 2—2 of FIG. 1;

FIG. 3 is a front elevational view, showing the inlet louver screen for the entry of air into the air purifier and absorber device in accordance with the present invention;

FIG. 4 is a rear elevational view showing the control knob for the blower motor section in accordance with the present invention;

FIG. 9 is a cross-sectional view taken along lines 9—9 of FIG. 2.

DETAILED DESCRIPTION

Figure 1:
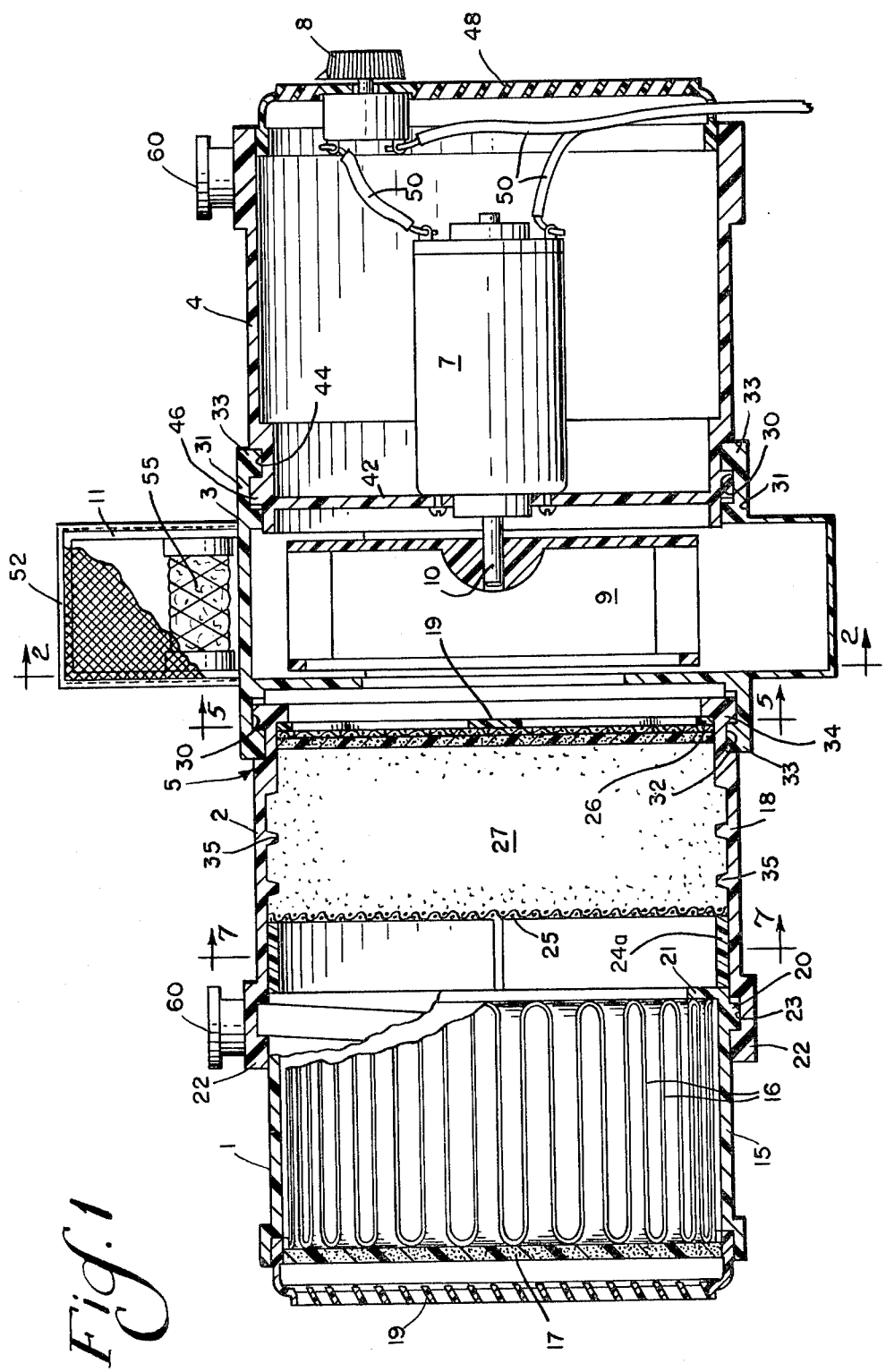
FIG. 1 is a horizontal cross-sectional view of the air filtering and absorbing device in accordance with the present invention.
Figure 8:
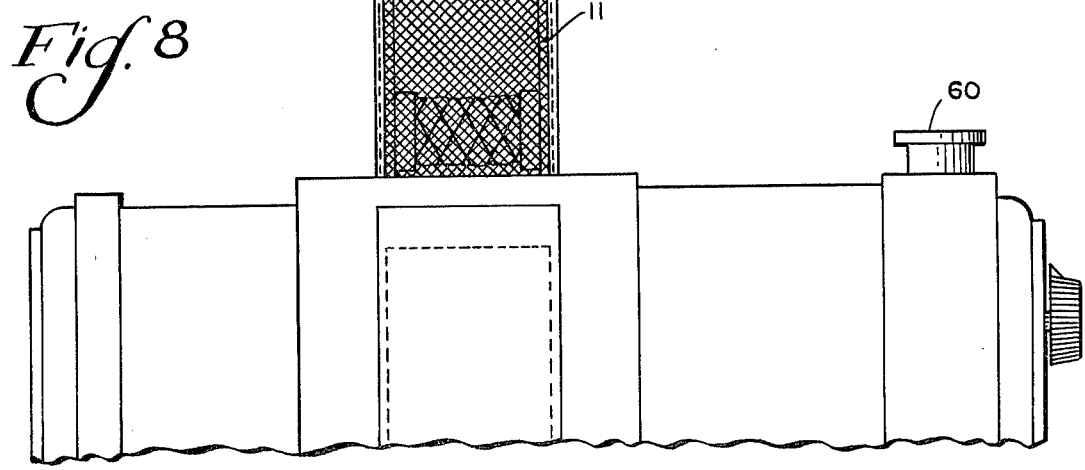
FIG. 8 is a top-plan view of the purifier and absorbing device in accordance with the present invention in longitudinal section with the parts broken away.

Referring now to the drawings in greater detail wherein like numerals have been used throughout the several views to designate the same or similar components, FIGS. 1 and 8, the air filter and absorber device of the present invention includes a plurality of functionally separate containers or sections comprising a first fibrous filter or paper filter section 1, a second activated carbon or absorber neutralizer filter section 2, a third blower casing or section 3 and a fourth driving motor chamber or section 4. When the various sections are interlocked together, the sections form an air filter and absorber casing or housing 5.

The motor chamber 4 contains an electric motor 7 and a control switch 8 connected by wires 50 thereto which controls the operation of the motor. The motor 7 is operatively connected to the impeller 9 by a motor shaft 10. Preferably, the end of the motor chamber or section 4 includes a louver member 48 (FIGS. 1 and 4) which permits cooling of the motor. As shown in FIG. 2, the impeller 9 includes a plurality of vanes 12 which directs the air flow, as shown by the arrow, in a clockwise direction through the volute 11 and the guard screen 13, as shown in FIGS. 1 and 9.

Figure 6:
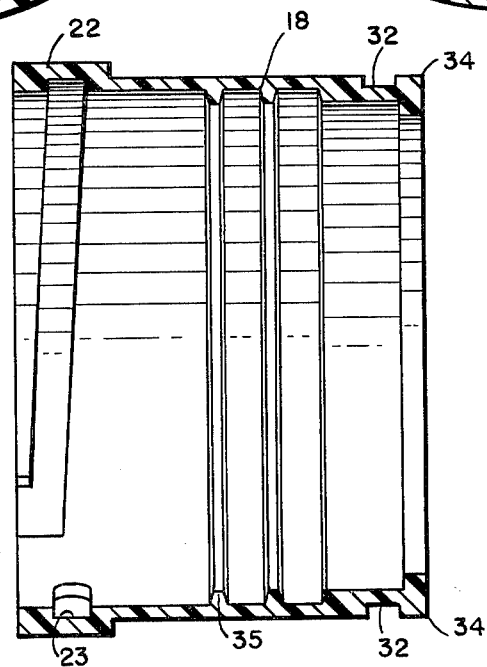
FIG. 6 is a vertical longitudinal axial sectional view of the activated carbon or neutralizer section in accordance with the present invention.

The fibrous filter section 1 is comprised of a cylindrical body portion 15 containing vegetable fibers in sheet form which is folded and formed into a spirally wound cynlindrical filter paper screen 16, having a large contact area confined between the intake louver 17 and the activated absorber section 2, which is comprised of a cylindrical holder 18, as shown in FIGS. 1 and 6. Preferably, the fibrous filter section 1 is composed of a HEPA air filter which is inserted within the fibrous filter section 1. If desired, a protective grill member 19 (FIGS. 1 and 3) may be mounted to the intake end of the fibrous filter section 1 to provide protection for the intake louver 17. Positioned intermediate the ends of the cylindrical body portion 15 of the fibrous filter section 1 are radial extensions 20 which are adapted to be matingly engagable to provide a thread-type joint or connection with the end extension portions 22 of the cylindrical holder portion 18 of the absorber or neutralizing section 2. The end extensions 22 include an inner annular groove 23 which is adapted to sealingly receive the radial extension 20 of the fibrous filter section 1 to provide a thread-like connection or joint between the fibrous filter section 1 and the absorber or neutralizing section 2 to hold the sections in axial alignment. The thread-like joint or connection between the filter section 1 and the absorber section 2 permits the ready access to and allows the substitution of fresh components, such as the filter paper in filter section 1 and the activated absorbing material in section 2 for the spent filter paper and activated material remaining after extended usage of the air purifying device.

Figures 5, 7:
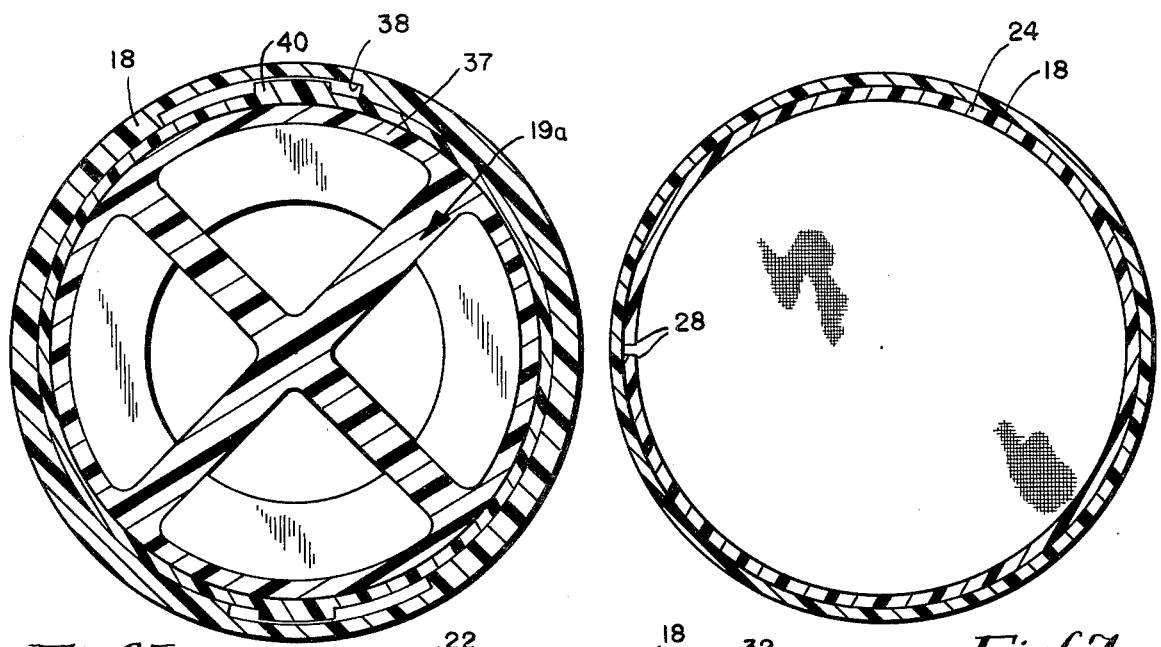
FIG. 5 is a cross-sectional view taken along lines 5—5 of FIG. 1.
FIG. 7 is a cross-sectional view taken along lines 7—7 of FIG. 1.

The fibrous filter section which, as a separate cylindrical unit, rests at an inner end endwise against the radially inwardly extending flange 21 on the cylindrical body 15 of the fibrous filter section 1. The annular folded paper 16 comprises a coil of folded, fibrous filter paper which is coiled into cylindrical form and fills the section 1 and forms an in-depth filter. It is held endwise inwardly in position by the louver 17. The bayonet thread-like joint connection brings the fibrous filter section 1 into endwise engagement with a compression ring 24a which presses screen 25 to put pressure upon the body of absorbent material 27 proximate screen 25. Alternatively, the screen 25 may have a compression ring 24a with collapsing tabs 28, as shown in FIG. 7, to hold the screen 25 under pressure axially by the friction of the compression ring 24a in the cylindrical holder 18 of the absorbent section 2. For additional support between 24a and the bottom of the granular body through screen 25, another support spider, such as spider 19a, may be interposed.

The absorber or neutralizing section 2 is joined to the blower section 3 by a thread-like joint or connection comprised of an inner annular groove 30 positioned in the blower section cylindrical body 31. Additionally, the cylindrical holder 18 of the absorber and neutralizing section 2 includes an outer annular groove 32 which is adapted to receive the end annular projection 33 of the blower section cylindrical body 31. Thus, the outer annular end projection 34 of the neutralizing section 2 housing of cylindrical holder 18 is adapted to be matingly engagable with inner annular groove 30 on the blower section cylindrical body 31 to provide a joint of connection of the absorber neutralizing section 2 to the blower section 3. The cylindrical holder 18 of the absorber or neutralizing section 2 includes a series of integral ridges or flanges 35 on the inner periphery thereof, as indicated in FIGS. 1 and 6 to increase the leakage distance and change of direction for the passage of air along the surface of the container which increases the efficiency of the activated absorber material over plain cylindrical walls. Preferably, the absorber or neutralizing section contains activated carbon in granular form, a material which is effective in removing most chemical and gaseous impurities from the atmosphere. The activated carbon 27 is compressed between circular screens 25 and 26. The screens, 25 and 26, may consist of several thicknesses of woven wire screen and the screen 25 fits within the cylindrical holder 18 and the margin of the screen 25 which may be several thicknesses, is pressed down upon the body of activated carbon 27 and held by compression ring 24a which frictionally engages the inner cylindrical surfaces adjacent the end of the absorbing neutralizing section 2. The pressure exerted upon the granulated carbon 27 in the absorber section 2 must be sufficient to firmly retain the granulated carbon therein and to eliminate any air holes or passageways between the carbon and the walls of the cylinder holder 18 when the air purifying device is rotated or turned over. Additionally, such pressure acting upon the granulated carbon eliminates noise resulting from the movement of the granulated carbon when the air purifying device is rotated or turned over. At the inner end of the absorber cylindrical holder 18, a supporting spider 19a (FIG. 5) having a sectional circular periphery or rim 37 is lodged in a sectional flange 38, as illustrated in FIGS. 1 and 5, by the radial projections 40 on the movable spider member 19a and the stationary sectional flange 38 on the cylindrical holder 18.

The motor 7 is mounted within the motor section 4 on a diaphram wall 42 of the motor section 2. The motor section 4 is joined to the blower section 3 by a thread-like joint or connection similar to the previous thread-like connections for the fibrous filter section 1 and the absorber neutralizer section 2. Specifically, the motr section 4 includes a forward extending outer annular groove 44 positioned adjacent an end porjection 46. The end projection 46 is adapted to be received by the inner annular groove 30 in the blower section cylindrical body 31 and the end projection 33 of the blower section cylindrical body 31 is adapted to be received by the outer annular groove 44 of the motor section 4. Thus, when the motor section is matingly engagable with the blower section, the sections are held in axial alignment with respect to one another.

The unique air purifying device of the present invention permits the user thereof to readily remove the fibrous filter section 1 and the attendant screen 25 from the remaining sections of the air purifying device to permit removal of the spent filter or absorber or neutralizing material 27 contained in the filter section 1 and in the neutralizing section 2. Upon removal of the neutralizing material, the user may remove the filter paper screen 16 and insert a new one into the fibrous filter section 1 and also replenish the neutralizing section with particulate absorber material, as desired.

The present invention possesses the flexibility that the user thereof may predeterminely omit the utilization of the absorber or neutralizing section altogether and directly to attach the fibrous filter section directly to the blower section cylindrical body 31 by aligning the thread-like joint together. Thus, the user may obtain a device which simply filters particulate material from the atmosphere, as desired.

Additionally, if the user thereof is desirous of utilizing only the abosrber or neutralizing section without the fibrous filter section, it is within the scope of the present invention to utilize an end cap (not shown) having means for providing a thread-like joint inserting the same cap to the end extension 22 of the cylindrical holder 18 of the neutralizing section 2 to provide an air purifying device having solely the absorber or neutralizing section acting upon the contaminated atmosphere. The end cap provides the necessary pressure to firmly retain the granulated carbon within the neutralizing section 2.

The present invention may also be provided with a wick member 55 (FIGS. 1 and 2), located within the shroud 52, which is positioned about the impeller or blower 9. The wick member is positioned so that the filtered air departing from the blower section 3 must pass thereabout. The wick member is adapted to receive fragrances and/or medicinals, which are imparted to the filtered air to provide the desired result. Also, projections 60 (FIGS. 1 and 8) are provided for attaching a carrying strap (not shown).

I claim:

1. A modular air purifying device including, in combination:

blower means operatively disposed within a blower casing;

motor drive means operatively connected to said blower means for rotatably driving said blower means;

air neutralizer section means comprising an air neutralizer casing therein containing a body of granules of chemical neutralizing compound for removing and absorbing undesired irritants, gases, vapors, and airborne solids from said air as it passes therethrough, said air neutralizer section means operably positioned adjacent said blower means in axial alignment therewith, air filter section means operably positioned adjacent said air neutralizer section means and comprising a coil of folded fibrous filter for filtering particulate material from said air as it passes therethrough, means to compress said granules by applying an axial force on said granules therewithin in compact aggregation and to preclude loose spots, pockets and voids from occurring within said body of granular material, and to thereby more effectively expose said drawn air to an optimal amount of said granules to in turn more effectively absorb said undesired irritants, gases, vapors and airborne solids from said air as it passes therethrough while simultaneously preventing said granules from noisily moving within said neutralizer section upon activation of said motor drive and blower means, both said air neutralizer section means and said air filter section means each being removably mounted for engagement with one another as well as interchangeable engagement with said blower means separately, such that upon activation of said motor drive means, said blower means rotates to draw air into and through first said filter section means and in turn said air neutralizer section means to provide purified air which is in turn exhausted from said blower means.

2. The modular air purifying device according to claim 1 in which said neutralizing compound in said air neutralizing section means comprises granules of activated carbon for chemical removal of said undesired irritants, gases, vapors, and airborne solids from said air passing therethrough.

3. The modular air purifying device according to claim 10 in which said neutralizer section means further comprises a plurality of non-porous inner annular flanges integrally emanating from said neutralizer casing for more effectively routing the passage of air through said neutralizer section means as to reroute said passing air repeatedly back into said body of granules thereby increasing the absorption and purifying efficiency of said contained body of granules.

4. The modular air purifying device according to claim 1 in which said blower means includes an impeller, said blower casing further including volute shroud means operably positioned about said blower means;

said purified air being exhausted from said modular air purifying device from said blower, through said blower casing and shroud.

5. The modular air purifying device according to claim 4 wherein said shroud further includes scented member means positioned in the path of said exhausted air for the purpose of imparting a scent to the exhausted filtered air.

6. The modular air purifying device according to claim 1 in which said means for removably attaching said filter section means to said air neutralizer section means, said blower means, and in turn said motor drive means comprises equivalently threaded coupling means enabling said interchangeability between said air filter section means and said air neutralizer section means with said blower means.

7. The modular air purifying device according to claim 1 in which said means for removably attaching said filter section means to said air neutralizer section means, said blower means, and in turn said motor drive means comprises equivalent bayonet-type coupling means permitting the aforesaid interchangeability between said air filter section means and said air neutralizer section means with said blower means.

8. The modular air purifying device according to claim 1 in which said compressive means includes a peripheral ring member interposed between said air neutralizing section means and said air filter section means, said peripheral ring member operably interposed between said air neutralizing section means and air filter section through threaded coupling therebetween said sections;

said axial applied force transmitted against said body of granules arising out of the force and extent to which said air neutralizer section means and air filter section means are threadedly coupled thereby permitting said applied force to be varied as a function of the degree to which said sections are threadedly coupled to one another.

9. The modular air purifying device of claim 8 in which said air neutralizer section means and air filter section means are threadedly coupled by a bayonet-type coupling device, said axial applied force being capable of alternative increase or decrease as a result of the fitment tightness imparted through said bayonet-type coupling device.

* * * * *